FIG. 5.

July 17, 1928.  
R. AERNOUT, BARON VAN LYNDEN  
1,677,220  
GRADIENT METER  
Filed Feb. 10, 1927 4 Sheets-Sheet 3

FIG. 6.

INVENTOR  
Robert Arnout,  
BY Baron Van Lynden  
Watson, Coit, Morse & Grindle  
ATTYS

FIG. 7.

Patented July 17, 1928.

1,677,220

UNITED STATES PATENT OFFICE.

ROBERT AERNOUT, BARON van LYNDEN, OF LONDON, ENGLAND.

GRADIENT METER.

Application filed February 10, 1927, Serial No. 167,243, and in Great Britain February 23, 1926.

This invention relates to gradient meters, clinometers and like instruments of the type covered by the present inventor's prior Letters Patent of the United States of America No. 1,567,347. The improvements embodied in the present invention have for their object a simplified construction more particularly with respect to the manner in which the weighted member is mounted and driven so as to effect automatically the necessary corrections for errors due to the inertia of the gravity-actuated indicator.

The improved construction is designed to be employed for various purposes and in different ways on different types of moving bodies such as motor road vehicles, aircraft or submarine vessels.

According to this invention there is combined with a pendulum and a weighted wheel, a mechanism by means of which this wheel is rotated so that it will have imparted to it an acceleration or deceleration which is substantially proportional to any acceleration or deceleration of the body on which the instrument is mounted as this body moves over the ground or through the air or water this driving mechanism comprising a shaft mounted coaxially with respect to the axis about which the pendulum swings and a second shaft driven by gearing from the first shaft and wholly carried by and swinging with the pendulum. In one construction the second shaft carries the weighted wheel this wheel and the shaft being mounted on and wholly carried by and swinging with the pendulum. In an alternative construction, the drive is transmitted from the first shaft which is mounted coaxially with respect to the axis about which the pendulum swings, to a second shaft driven by gearing from the first shaft and wholly carried by and swinging with the pendulum, while a third shaft which carries the weighted wheel is driven by gearing from the second shaft and is also mounted coaxially with respect to the axis about which the pendulum swings. In either case a clutch device is incorporated in the mechanism by means of which the weighted wheel is driven this clutch device while normally transmitting the drive to the weighted wheel being arranged to yield automatically in the event of undue irregularities in the drive so as to prevent damage to the mechanism from these irregularities. It is desirable to provide on the pendulum a weight whose position on the pendulum may be adjusted so as to permit of a compensating setting of the mechanism to be effected. In order to obviate sudden movements of the pendulum, it is convenient to provide a dashpot device suitably connected to the pendulum.

The accompanying drawings illustrate by way of example alternative constructions which may be adopted in carrying out the invention, these constructions being designed more particularly for use on motor road vehicles. In these drawings:—

The above views are to some extent diagrammatic in order to permit of certain features being shown more clearly.

Figure 1:
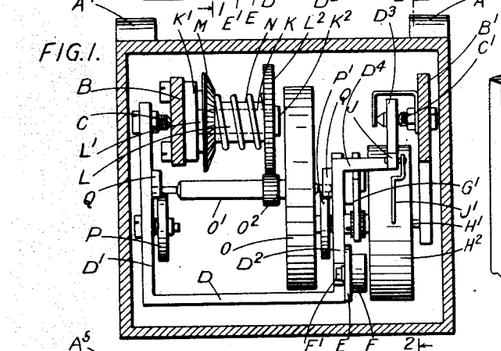
Figure 1 is a sectional elevation of one form of the apparatus as viewed from the back thereof, the section being taken as on the line 1—1 in Figure 2 looking in the direction of the arrows.
Figure 2:
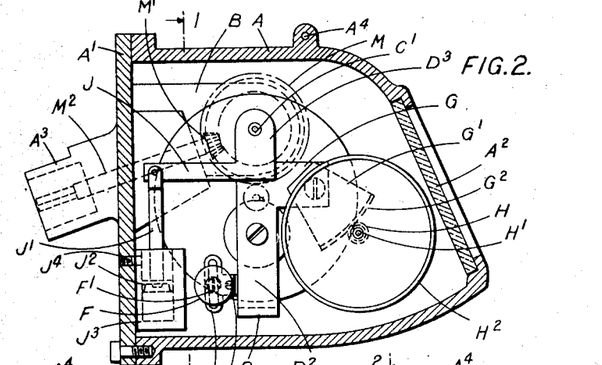
Figure 2 is a side elevation of the apparatus partly in section the section being taken on the line 2—2 in Figure 1 looking in the direction of the arrows.

Referring to the construction illustrated in Figures 1 and 2, a casing A of suitable shape is provided to enclose the apparatus, this casing having a back plate $A^1$ on which is mounted as far as practicable the mechanism, so that access thereto can be obtained readily by removing the back plate. In the front of the casing A is a window $A^2$ through which may be read the indications given by the gradient meter.

Projecting from the back plate $A^1$ are two bracket members or plates B and $B^1$ which serve to support the principal parts of the apparatus. Suspended from these brackets B $B^1$ by pivots such as C $C^1$ of suitable construction is a U-shaped member constituting a pendulum this pendulum comprising a horizontal part D and two lateral arms, of which the one $D^1$ is straight and extends substantially vertically throughout its whole length, while the other arm comprises two substantially straight vertical portions $D^2$ $D^3$ connected by a horizontal portion $D^4$. These lateral arms $D^1$ and $D^2$ $D^4$ $D^3$ extend between the horizontal part D of the pendulum and the pivots C $C^1$. The part $D^2$ of the one pendulum arm is provided with a laterally extending lug E having in it a slot $E^1$ and a weight F of suitable shape and dimensions is attached to the pendulum by a set screw $F^1$ which passes through the slot $E^1$ so that the position of the weight F can be adjusted for the purpose of compensation and general adjustment of the mechanism.

The pendulum arm $D^2$ is also formed with a laterally extending lug G which carries or is formed as a segmental plate $G^1$ having a toothed rack $G^2$. This rack meshes with a pinion H on a rotatable spindle $H^1$ which carries an indicating drum $H^2$. This drum is arranged so that a scale marked on its periphery can be read through the window $A^2$ in the casing A. The spindle $H^1$ is carried at its ends in suitable bearings respectively on a part of the bracket $B^1$ and on another suitably arranged bracket which extends from the back plate $A^1$ but is not shown in the drawings. Projecting from the part $D^3$ of the one pendulum arm is an arm J which extends towards the back of the apparatus, that is to say, in the opposite direction to that in which extends the lug G. A rod or link $J^1$ is pivotally connected at one end to the end of the arm J and at the other end this rod $J^1$ carries a piston $J^2$ which lies in and can reciprocate in a cylinder $J^3$ mounted on the back plate $A^1$. This cylinder $J^3$ and the piston $J^2$ therein constitute a dashpot device the cylinder being filled with oil or other suitable liquid introduced conveniently through an opening in the back plate A which is shown as being closed by a screwed plug $J^4$.

A short shaft K is carried by and projects from the face of a plate $K^1$ which in turn is attached to one side of the bracket B. The shaft K is positioned so that its axis coincides with the axis of the pivots C $C^1$ about which the pendulum swings. A sleeve L is mounted and can rotate freely on the shaft K and has formed on its inner end a flange or shoulder $L^1$ while on its outer end is fixed a toothed wheel $L^2$. This sleeve is retained on the shaft K by a set screw with head $K^2$ at the end of the shaft K. On the sleeve L and adjacent to the shoulder $L^1$ is carried loosely a bevel wheel M one face of which is pressed into frictional engagement with the face of the shoulder $L^1$ by one end of a coiled spring N whose other end bears against the opposed face of the toothed wheel $L^2$. Rotation is imparted to the sleeve L and toothed wheel $L^2$ by means of a bevel pinion $M^1$ mounted on the end of a short shaft $M^2$ rotatably carried in a lug $A^3$ suitably formed on or carried by the back plate $A^1$. The outer end of the shaft $M^2$ is squared or otherwise shaped and adapted to be coupled to the end of a flexible driving shaft through which the mechanism may be driven from the driving gear or road wheels of the vehicle on which the gradient meter is mounted this drive being so arranged that the mechanism within the casing will be driven at a speed which is substantially proportional to the road speed of the vehicle or so that a weighted wheel driven by this mechanism will be rotated and have imparted to it an acceleration or deceleration which is substantially proportional to any acceleration or deceleration of the vehicle. Frictional engagement after the manner of a clutch is maintained between the opposed faces of the bevel wheel M and the shoulder $L^1$ which are kept in contact by the spring N so that while the toothed wheel $L^2$ will be driven in the desired manner yet in the event of sudden shocks in the driving mechanism or irregularities in the torque, as for instance, if the road wheels of the vehicle skid and rotate suddenly at increased speed or if their rotation is suddenly checked, the frictionally engaging surfaces of the clutch device will slip and thus prevent the irregularities from being communicated to the toothed wheel $L^2$ and to the mechanism driven thereby.

Figure 4:
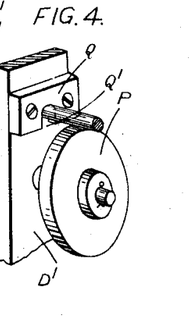
Figure 4 is a perspective view illustrating a method that may be adopted conveniently in the mounting of a rotating shaft in the apparatus.

A weighted wheel O of suitable construction is fixed on a shaft $O^1$ which carries also a toothed pinion $O^2$ gearing with the toothed wheel $L^2$. This shaft $O^1$ is mounted on the pendulum so as to rotate freely relatively to the pendulum and yet swing with the latter. A convenient method of mounting the shaft $O^1$ so as to reduce friction is to dispose the reduced ends of this shaft so that they rest and can rotate on the peripheries of two discs or rollers P $P^1$ which are respectively carried rotatably on studs by the side members $D^1$ and $D^2$ of the pendulum. The ends of the shaft are kept in place on the disc P $P^1$ by inverted U-shaped members Q attached to the inner faces of the pendulum side members $D^1 D^2$. The sides of the inverted U-shaped recess $Q^1$ in each member Q prevents the end of the shaft $O^1$ from being displaced laterally while the disc on which the end of the shaft rests constitutes in effect a roller bearing and thus enables frictional resistance to the rotation of the shaft $O^1$ to be reduced. The arrangement is such that where the apparatus is mounted on a motor road vehicle the weighted wheel O will be rotated for example constantly and at a speed which is substantially proportional to the speed of the vehicle. Thus fluctuations in this road speed which, owing to the inertia of a normal pendulum, would cause inaccurate readings, will result in the present construction in corresponding accelerations or decelerations in the rotation of the wheel O and this will effect automatically the necessary corrections in the pendulum movements.

The apparatus as above described is mounted in a suitable position for example in the dashboard of a motor road vehicle with the window $A^2$ in the casing A arranged in a convenient position for reading the indications given. The shaft $M^2$ is connected by a flexible drive device with the mechanism employed for driving the speedometer or otherwise arranged so that the drive will be transmitted from some part of the vehicle mechanism which will rotate at a speed substantially proportional to the speed of the vehicle along the road. Then in accordance with the road speed the weighted wheel O will be rotated.

By movement of the weight F on the pendulum it is possible to make an adjustment which will have the effect of altering the inertia of the pendulum with relation to the inertia of the flywheel. Thus if it is found that the action of the flywheel is to give an excess of compensation during acceleration or deceleration, then by lowering the weight F on the pendulum, the inertia of the pendulum is in effect increased and thus the inertia of the flywheel may be correctly balanced.

In order to set the instrument so as to give a zero reading when on the level, it is convenient to construct the casing A so that the whole instrument may be swung or tilted as for example about pivots passing through lugs $A^4$ formed on the casing A. The casing may then be fixed by a clamping screw or the swinging movement may be carried out by means of an adjusting screw suitably arranged. It is to be noted that when setting the instrument so as to give a zero reading it is desirable to arrange that when the body on which it is mounted is standing on the level, the instrument should give an indication as of a slight upward gradient, for example, of the order of one half per cent, since as soon as the body is in motion, the frictional resistance to rotation of the weighted wheel O will cause the pendulum to be moved slightly and to an extent sufficient to give a zero reading while the vehicle or other body on which the instrument is mounted is travelling on the level.

When the vehicle is moving along a road, so long as the road surface is level the gradient meter will give a zero indication irrespective of acceleration or deceleration of the vehicle, any tendency of the pendulum to swing in either direction as a result of such acceleration or deceleration being counteracted by the inertia of the weighted wheel O. Also as indicated, if there is any irregularity in the drive, as for example by reason of skidding of the road wheels, the clutch device in the driving mechanism will yield and these irregularities or shocks will not be communicated to the weighted wheel O or to the pendulum. On an incline the pendulum will swing and by rotating the indicating drum $H^2$ will give a substantially correct indication of the gradient, any errors in this indication which might tend to appear owing to the inertia of the pendulum being neutralized or automatically corrected by the inertia of the rotating weighted wheel O.

Figure 3:
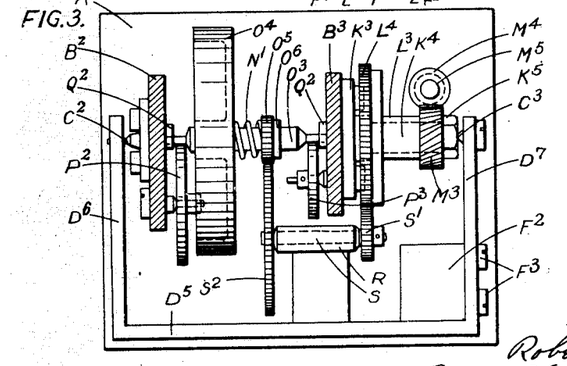
Figure 3 is a sectional elevation somewhat similar to that shown in Figure 1 but looking from the front of the apparatus and illustrating a modified construction.

Referring to the alternative construction illustrated in Figure 3, it will be seen here that the shaft $O^3$ carrying the weighted wheel $O^4$ is not mounted on the pendulum $D^5$ but is arranged coaxially with the pivots $C^2 C^3$ about which the pendulum swings, while the drive is transmitted through an intermediate shaft mounted on the pendulum. The pendulum comprises a single U-shaped member with a horizontal part $D^5$ and lateral arms $D^6 D^7$ both these arms being conveniently straight and similar. An adjustable weight $F^2$ is attached to the pendulum arm $D^7$ in a suitable manner the details of which are not shown in the drawing, but preferably a slot and set screws $F^3$ are employed, somewhat as described in connection with the construction shown in Figures 1 and 2. The casing of the apparatus is not shown in Figure 3 the back plate $A^5$ alone being indicated. Projecting from this back plate are two bracket members $B^2$ and $B^3$ one of these brackets $B^2$ being arranged adjacent to the arm $D^6$ of the pendulum and carrying the pivot $C^2$ which supports this arm. The other bracket $B^3$ is disposed in a suitably intermediate position between the arms $D^6$ and $D^7$ of the pendulum and has fixed on the one face thereof the flange or plate $K^3$ of the shaft $K^4$ which carries the hollow driving shaft or sleeve $L^3$. The outer end $K^5$ of the shaft $K^4$ is engaged by the second pivot $C^3$ which supports the arm $D^7$ of the pendulum. The hollow shaft $L^3$ which can rotate freely on the shaft $K^4$ carries at one end the toothed wheel $L^4$ and at the other end a worm wheel $M^3$ which is engaged by a worm $M^4$ on the shaft $M^5$ through which the drive is transmitted to the apparatus.

In a bearing member R of suitable type and construction, which is disposed in some convenient manner on the horizontal member $D^5$ of the pendulum, there is rotatably mounted a shaft S. On one end of this shaft is a pinion $S^1$ which meshes with the toothed wheel $L^4$ while on the other end is a toothed wheel $S^2$ which gears with a toothed pinion $O^5$ through which rotation is imparted to the weighted wheel $O^4$. In this case a slipping clutch device is conveniently arranged between the pinion $O^5$ and the shaft $O^3$ which carries the weighted wheel $O^4$. With this object the shaft $O^3$ is provided with a shoulder $O^6$ against one face of which bears the face of the pinion $O^5$ which is loosely mounted on the shaft $O^3$ but is constantly pressed against the shoulder or flange $O^6$ by one end of the coiled spring $N^1$ whose opposite end bears against the face of the weighted wheel $O^4$. The opposed faces of the shoulder $O^6$ and pinion $O^5$ are suitably formed to effect the desired frictional engagement between these parts while permitting slip in the event of irregularities in the drive.

The shaft $O^3$ is mounted on friction reducing bearings formed and arranged conveniently in substantially the same way as described with reference to the construction shown in Figures 1 and 2. The reduced ends of the shaft $O^3$ rest respectively on discs $P^2$ and $P^3$ of which the former is carried by the bracket $B^2$ while the disc $P^3$ is carried by the bracket $B^3$. Inverted U-shaped members $Q^2$ attached respectively to the brackets $B^2$ and $B^3$ keep the ends of the shaft $O^3$ in place on the upper edges of the discs $P^2$ and $P^3$.

The apparatus operates in substantially the same way as that previously described and shown with reference to Figures 1 and 2. The drive is transmitted from the shaft $M^5$ through the hollow shaft $L^3$ and intermediate shaft S and gear wheels carried thereby to the pinion $O^5$ and thence through the clutch device to the shaft $O^3$ and weighted wheel $O^4$ which is thus rotated at a speed substantially proportional to the road speed of the vehicle on which the apparatus is mounted. The inertia of the wheel $O^4$ will correct automatically any errors which tend to arise from the inertia of the pendulum. The movements of the pendulum may be communicated to and indicated by a swinging or rotatable member which is not shown in Figure 3, but may be arranged in a manner somewhat similar to the indicating drum $H^2$ in the construction shown and described with reference to Figures 1 and 2.

Figure 5:
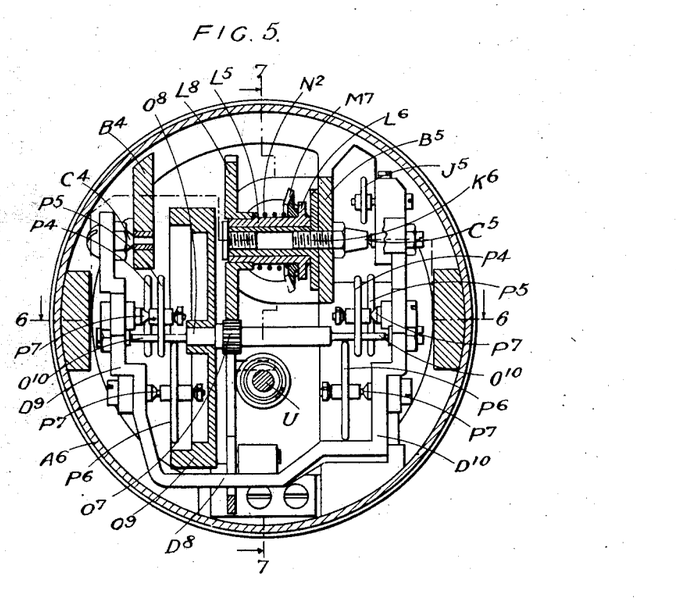
Figure 5 is a transverse section on the line 5—5 in Figure 6 or in Figure 7 illustrating a modified form of the instrument shown in Figure 1 wherein the weighted wheel is carried wholly by the pendulum, looking in the direction of the arrows.
Figure 6:
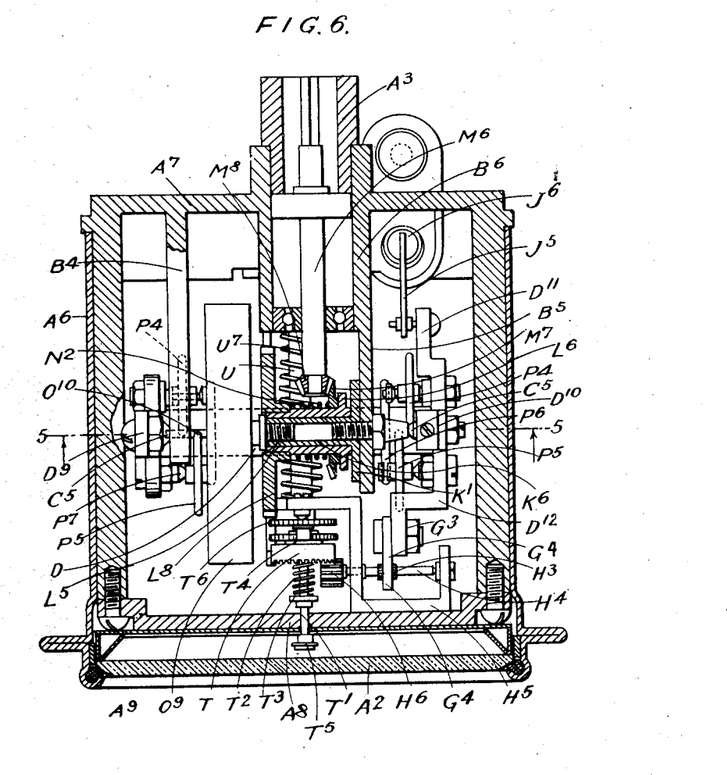
Figure 6 is a sectional plan on the broken line 6—6 in Figure 5 looking in the direction of the arrows.
Figure 7:
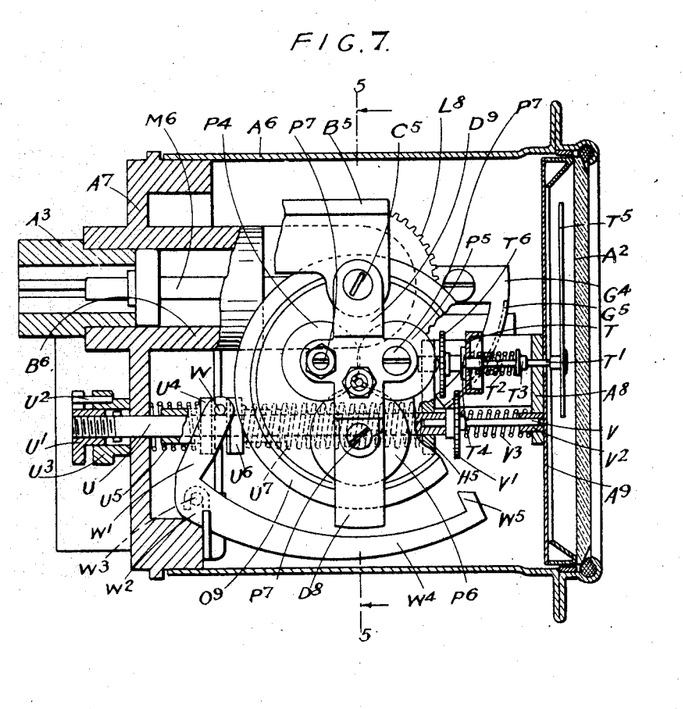
Figure 7 is a section on the broken line 7—7 in Figure 5 looking in the direction of the arrows.

In the construction illustrated in Figures 5, 6 and 7 the apparatus comprises a cylindrical casing $A^6$, having a rear wall $A^7$ from which project two supporting brackets $B^4$, $B^5$, one, $B^5$, of which is formed integral with a tubular boss or housing $B^6$ carrying a driving shaft $M^6$. Supported in bearings $C^4$, $C^5$ on the brackets $B^4$, $B^5$ is a pendulum $D^8$. This pendulum comprises a horizontal portion $D^8$ and two vertical portions $D^9$, $D^{10}$. Rigidly mounted on the bracket $B^5$ and arranged coaxially with the pivot bearings $C^4$, $C^5$ of the pendulum is a short shaft $K^6$ on which is adapted to rotate freely a sleeve or hollow shaft $L^5$ having a flange $L^6$ against which is pressed by a spring $M^2$ a bevel wheel $M^7$. The bevel wheel $M^7$ engages with a bevel wheel $M^8$ rigidly mounted on the end of the driving shaft $M^6$. In this way the bevel wheel $M^7$ is frictionally connected to the sleeve $L^5$ by reason of its being pressed against the flange $L^6$. The sleeve $L^5$ is held in place on the shaft $K^6$ by means of a screwthreaded member $L^7$ engaging the interior of the shaft $K^6$ as shown.

Also mounted on the sleeve $L^5$ is a pinion $L^8$ which engages with a pinion $O^7$ on a shaft $O^8$ supported in suitable bearings on the portions $D^9$, $D^{10}$ of the pendulum $D^8$ and carrying also the weighted wheel $O^9$. The shaft $O^8$ is conveniently supported in friction reducing bearings each comprising three disc-like members $P^4$, $P^5$ and $P^6$ the rims of which engage the reduced ends $O^{10}$ of the shaft $O^8$, each of these disc-like members being supported in bearings $P^7$ carried by the parts $D^9$, $D^{10}$ of the pendulum $D^8$.

The apparatus operates in substantially the same way as that previously described and shown with reference to Figures 1 and 2. The drive is transmitted from the shaft $M^6$ through the bevel wheels $M^8$, $M^7$ and the friction clutch device constituted by the bevel wheel $M^7$ being pressed into contact with the flange $L^6$ to the hollow sleeve $L^5$ and thence through the gear wheels $L^8$, $O^7$ to the shaft $O^8$ and weighted wheel $O^9$ which is thus rotated at a speed substantially proportional to the road speed of the vehicle on which the apparatus is mounted. The inertia of the wheel $O^9$ will tend automatically to prevent errors arising from the inertia of the pendulum.

The movements of the pendulum may be communicated to an indicating needle or the like in various ways but in the construction shown the upper end of the member $D^{10}$ of the pendulum is provided with two lateral extensions $D^{11}$, $D^{12}$ to one, $D^{12}$, of which is connected by a bolt $G^3$, a toothed quadrant $G^4$. The teeth $G^5$ of the quadrant $G^4$ engage with a pinion $H^3$ rigidly mounted on a shaft $H^4$ which is carried in bearings in a suitable support $H^5$ mounted on a bar $A^8$ extending across the front of the casing $A^6$.

The shaft $H^4$ carries at one end a second pinion $H^6$ meshing with a crown wheel $T$ mounted on a shaft $T^1$ disposed at right angles to the shaft $H^4$ and supported in bearings in an extension of the support $H^5$ and in the bar $A^8$. The crown wheel $T$ is connected to the shaft $T^1$ by means of a friction clutch device comprising a spring $T^2$ bearing at one end against a collar $T^3$ on the shaft $T^1$ and acting at its other end on one side of the crown wheel $T$ so as to press it into engagement with a second collar $T^4$ on the shaft $T^1$. The shaft $T^1$ extends through the bar $A^8$ and also through a plate $A^9$ constituting a dial and carries at its outer end an indicating needle $T^5$ adapted to move over a suitably graduated scale on the dial. The lateral extension $D^{11}$ of the part $D^{10}$ of the pendulum is connected by a member $J^5$ to a dashpot device indicated at $J^6$ and adapted to prevent sudden movements of the pendulum.

Means are conveniently provided for altering the setting of the indicating needle $T^5$ relatively to the pendulum. In the construction illustrated such means comprise a rod $U$ mounted to slide and to rotate in suitable supports constituted respectively by the end portion $A^7$ of the casing and by the support $H^5$ above referred to. The outer end of the rod $U$ extends through the casing $A^7$ and is screwthreaded to receive a disc-like operating member $U^1$ whereby the rod can be moved longitudinally. The member $U^1$ carries a pin $U^2$ which normally engages a suitable hole in a second operating member $U^3$ connected to the rod $U$ by suitable keys or the like which permit the rod to slide through the member $U^3$ but enable this rod to be rotated or held from rotation by the member $U^3$. Supported in a suitable bore in the inner end of the rod $U$ and held from rotation relatively thereto is one end of a short shaft $V$ carrying a gear wheel $V^1$, the other end of the shaft $V$ being supported freely in a bearing $V^2$ in the bar $A^8$. A spring $V^3$ is provided tending to move the gear wheel $V^1$ towards the rod $U$. Rigidly mounted on the rod $U$ is a collar $U^4$ against which bears one end of a spring $U^5$ the other end of which bears on the casing $A^7$. A second collar $U^6$ on the rod $U$ is free to slide on this rod and is acted upon by one end of a spring $U^7$ the other end of which bears against the support $H^5$. Between the two collars $U^4$ and $U^6$ is disposed a pin $W$ carried by one arm $W^1$ of a member $W^2$ pivoted at $W^3$ the other arm $W^4$ of this member being of arcuate form as shown and having a projection or stop $W^5$ at its end. A glass $A^{10}$ is provided to cover the dial $A^9$ and needles $T^5$.

The operation of the setting mechanism is as follows.

When it is desired to alter the setting of the needle $T^5$ relatively to the pendulum, first the adjusting member $U^1$ is pulled outwards so as to move the rod $U$ to the left in Figure 7, and is then slightly rotated relatively to the member $U^3$ so as to move the pin $U^2$ out of line with its hole. The member $U^1$ can then be released and is retained in position by the pin $U^2$ resting on the outer face of the member $U^3$. This outward movement of the rod $U$ performs two functions: It permits the spring $V^3$ to move the gear wheel $V^1$ into engagement with a gear wheel $T^6$ rigidly mounted on the shaft $T^1$, and also move the collar $U^4$ so as to permit the collar $U^6$ to move under the action of its spring $U^7$ and thus act on the pin $W$ to rock the member $W^2$ so that its arm $W^4$ is brought into engagement with the pendulum $D^8$. The pendulum is thus held frictionally against movement. Rotation of the rod $U$ by means of the adjusting member $U^3$ will now act through the gear wheels $V^1$ and $T^6$ to rotate the shaft $T^1$. Since the pendulum is held against movement the crown wheel $T$ cannot rotate so that the shaft $T^1$ carrying the indicating needle $T^5$ will be moved relatively to the crown wheel $T$, the friction between this wheel and the flange $T^4$ which normally serves to transmit the motion of the crown wheel to the shaft $T^1$ being overcome. Thus, the setting of the needle $T^5$ relatively to the crown wheel $T$ and hence to the pendulum $D^8$ can be varied. When the desired setting is effected the member $U^3$ is held stationary and the member $U^1$ rotated until the pin $U^2$ drops into its hole thus permitting the rod $U$ to move to the right in Figure 7 and thereby cause disengagement of the gear wheels $V^1$ and $T^6$ and rock the member $W^2$ to release the pendulum. The arm $W^1$ and stop $W^5$ of the member $W^2$ serve normally to limit the movement of the pendulum $D^8$.

It will be understood that the clutch device which has been referred to as being conveniently arranged in the mechanism through which the weighted wheel is driven may be constructed and arranged otherwise than as more particularly described above. Also different structures of dashpot device may be used and combined with the pendulum in various ways as found desirable or convenient.

The details of construction may be modified as found desirable in accordance with the purpose for which the gradient meter is to be used. Similarly, the rotation of the weighted wheel $O$ may be effected from various sources and in various ways as for example where the device is mounted on an aeroplane an air screw and flexible shafting driven thereby may be used, or again, if the device is mounted in a submarine, a water driven propeller or turbine may be employed for the same purpose or, in the case of a submarine, the drive may be taken off the propeller shaft.

It may be pointed out that when used on air craft or on a submarine, it may not be practically possible to arrange for the rotational speed of the weighted wheel to be strictly proportional to the speed of the body on which the instrument is mounted owing to the slip of the propeller, turbine or other device that would be used to drive the weighted wheel. Nevertheless the desired correction of the pendulum can be effected in the manner described since the speed at which the flywheel is driven will be in definite relation to the movement of the body on which it is mounted through the air or water.

What I claim as my invention and desire to secure by Letters Patent is:—

1. In a gradient meter mounted on a moving body, the combination of a gravity-actuated member, an indicator operatively connected to the gravity actuated member, a shaft mounted coaxially with respect to the axis about which the gravity-actuated member moves, mechanism for rotating this shaft at a speed proportional to that of the moving body, a driven shaft carried wholly by and swinging with the gravity-actuated member, transmission gearing connecting these two shafts, and a weighted wheel operatively connected to the driven shaft so that its speed is proportional to the speed of such shaft.

2. In a gradient meter mounted on a moving body, the combination of a pendulum, an indicating device actuated by the pendulum, a weighted wheel, and mechanism for rotating this wheel at a speed proportional to that of the moving body, this mechanism including a driving shaft mounted coaxially with respect to the axis about which the pendulum swings, a driven shaft carried wholly by and swinging with the pendulum, and operative driving connections between the two shafts and between the driven shaft and the weighted wheel whereby the weighted wheel is caused to rotate at a speed proportional to that of the driven shaft.

3. In a gradient meter mounted on a moving body, the combination of a gravity-actuated member, an indicator operatively connected to the gravity actuated member, a weighted wheel, and mechanism for rotating this wheel including a driving shaft mounted coaxially with respect to the axis about which the gravity-actuated member moves, means for rotating said drive shaft at a speed proportional to that of the moving body, a driven shaft carried wholly by and swinging with the gravity-actuated member, operative driving connections between the two shafts and between the driven shaft and the weighted wheel whereby the weighted wheel is caused to rotate at a speed proportional to that of the driven shaft, and a friction clutch device in the mechanism for rotating the weighted wheel.

4. In a gradient meter mounted on a moving body, the combination with a gravity-actuated member, an indicator operatively connected to the gravity actuated member, a weight adjustably mounted on said member, a driving shaft mounted coaxially with respect to the axis about which the gravity-actuated member moves, mechanism for rotating this shaft at a speed proportional to that of the moving body, a driven shaft carried wholly by and swinging with the gravity-actuated member, transmission gearing connecting these two shafts, and a weighted wheel operatively connected to the driven shaft so that its speed is proportional to the speed of such shaft.

5. In a gradient meter mounted on a moving body, the combination of a gravity-actuated member, an indicator operatively connected to the gravity actuated member, a dashpot device, an operative connection between the dashpot device and the member, a weighted wheel, and mechanism for rotating this wheel at a speed proportional to that of the moving body, this mechanism including a driving shaft mounted coaxially with respect to the axis about which the gravity-actuated member moves, means for rotating said drive shaft at a speed proportional to that of the moving body, a driven shaft carried wholly by and swinging with the gravity-actuated member, and operative driving connections between the two shafts and between the driven shaft and the weighted wheel whereby the weighted wheel is caused to rotate at a speed proportional to that of the driven shaft.

6. In a gradient meter mounted on a moving body, the combination of a pendulum, an indicating device actuated from the pendulum, mechanism for altering the setting of the indicating device relatively to the pendulum, a weighted wheel, and mechanism for rotating this wheel at a speed proportional to that of the moving body, this mechanism including a driving shaft mounted coaxially with respect to the axis about which the pendulum swings, a driven shaft carried wholly by and swinging with the pendulum, and operative driving connections between the two shafts and between the driven shaft and the weighted wheel whereby the weighted wheel is caused to rotate at a speed proportional to that of the driven shaft.

7. In a gradient meter mounted on a moving body, the combination of a pendulum, an indicating device actuated from the pendulum, a friction clutch device between the pendulum and the indicating device, means for holding the pendulum and for moving the indicating device relatively thereto, a weighted wheel, and mechanism for rotating this wheel at a speed proportional to that of the moving body, this mechanism including a driving shaft mounted coaxially with respect to the axis about which the pendulum swings, a driven shaft carried wholly by and swinging with the pendulum, and operative driving connections between the two shafts and between the driven shaft and the weighted wheel whereby the weighted wheel is caused to rotate at a speed proportional to that of the driven shaft.

8. In a gradient meter mounted on a moving body, the combination of a pendulum, a weight adjustably mounted on the pendulum, an indicating device actuated from the pendulum, mechanism for altering the setting of the indicating device relatively to the pendulum, a weighted wheel, and mechanism for rotating this wheel at a speed proportional to that of the moving body, this mechanism including a driving shaft mounted coaxially with respect to the axis about which the pendulum swings, a driven shaft carried wholly by and swinging with the pendulum, and operative driving connections between the two shafts and between the driven shaft and the weighted wheel whereby the weighted wheel is caused to rotate at a speed proportional to that of the driven shaft.

9. In a gradient meter mounted on a moving body, the combination of a pendulum, a weight adjustably mounted on the pendulum, an indicating device actuated from the pendulum, a friction clutch device between the pendulum and the indicating device, means for holding the pendulum and for moving the indicating device relatively thereto, a weighted wheel, and mechanism for rotating this wheel at a speed proportional to that of the moving body, this mechanism including a driving shaft mounted coaxially with respect to the axis about which the pendulum swings, a driven shaft carried wholly by and swinging with the pendulum, and operative driving connections between the two shafts and between the driven shaft and the weighted wheel whereby the weighted wheel is caused to rotate at a speed proportional to that of the driven shaft.

10. In a gradient meter mounted on a moving body, the combination of a gravity-actuated member, an indicator operatively connected to the gravity actuated member, a driving shaft mounted coaxially with respect to the axis about which the gravity-actuated member moves, mechanism for rotating this shaft at a speed proportional to that of the moving body, a driven shaft carried wholly by and swinging with the gravity-actuated member, a weighted wheel rigidly mounted on the driven shaft, and transmission gearing connecting the driving and driven shafts.

11. In a gradient meter mounted on a moving body, the combination of a gravity-actuated gradient member, an indicator operatively connected to the gravity actuated member, an adjustable weight mounted on said gravity-actuated member, a driving shaft mounted coaxially with respect to the axis about which the gravity-actuated member moves, mechanism for rotating this shaft at a speed proportional to that of the moving body, a driven shaft carried wholly by and swinging with the gravity-actuated member, a weighted wheel rigidly mounted on the driven shaft, and transmission gearing connecting the driving and driven shafts.

12. In a gradient meter mounted on a moving body, the combination of a gravity-actuated gradient member, an indicator operatively connected to the gravity actuated member, a dashpot device, an operative connection between the dashpot device and the said gravity-actuated member, a driving shaft mounted coaxially with respect to the axis about which the gravity-actuated member moves, mechanism for rotating this shaft at a speed proportional to that of the moving body, a driven shaft carried wholly by and swinging with the gravity-actuated member, a weighted wheel rigidly mounted on the driven shaft, and transmission gearing connecting the driving and driven shafts.

13. In a gradient meter mounted on a moving body, the combination of a pendulum, an indicating device actuated from the pendulum, a friction clutch device between the pendulum and the indicator, means for holding the pendulum and for moving the indicator relatively thereto, a driving shaft mounted coaxially with respect to the axis about which the pendulum swings, a driving member for rotating this shaft at a speed proportional to that of the moving body, a driven shaft carried wholly by and swinging with the pendulum, a weighted wheel mounted on this driven shaft, and transmission gearing connecting the driving and driven shafts.

14. In a gradient meter mounted on a moving body, the combination of a pendulum, a weight adjustably mounted on the pendulum, an indicating device actuated from the pendulum, a friction clutch device between the pendulum and the indicator, means for holding the pendulum and for moving the indicator relatively thereto, a driving shaft mounted coaxially with respect to the axis about which the pendulum swings, a driving means for rotating this shaft at a speed proportional to that of the moving body, a driven shaft carried wholly by and swinging with the pendulum, a weighted wheel mounted on this driven shaft, and transmission gearing connecting the driving and driven shafts.

15. In a gradient meter mounted on a moving body the combination of a gravity actuated member, the position of which indicates the gradient, a shaft mounted coaxially with respect to the axis about which the gravity actuated member moves, mechanism for rotating this shaft at a speed proportional to that of the moving body, a driven shaft carried wholly by and swinging with the gravity actuated member, an operative driving connection between these two shafts, and a weighted wheel operatively connected to the driven shaft so that its speed is proportional to the speed of such shaft.

In testimony whereof I have signed my name to this specification.

ROBERT AERNOUT, BARON van LYNDEN.